June 20, 1967

J. K. MILLS 3,327,202

REGULATED D.C. POWER SUPPLY SYSTEM

Filed June 3, 1963

INVENTOR
J. K. MILLS
BY
Reg M. Porter Jr.
ATTORNEY

United States Patent Office 3,327,202
Patented June 20, 1967

3,327,202
REGULATED D.C. POWER SUPPLY SYSTEM
John K. Mills, Morristown, N.J., assignor to Bell Telephone Laboratories, Incorporated, New York, N.Y., a corporation of New York
Filed June 3, 1963, Ser. No. 285,136
6 Claims. (Cl. 323—22)

This invention relates to electrical power conversion systems and more particularly, although in its broader aspects not exclusively, to apparatus for regulating the amount of electrical energy delivered to a load from a source of direct-current potential.

Power supplies for electronic equipment are often required to deliver regulated operating potentials to the connected circuits. The magnitude of the voltage delivered by such a power supply must remain substantially constant even though the impedance represented by the loading circuitry might vary over a wide range of values. Even small changes in the potential supplied might seriously affect the performance of some forms of equipment. Electronically controlled oscillators, for example, are subject to considerable frequency drift unless the supply voltage is regulated. Similarly, the operating characteristics of certain components, such as the transistor, are quite sensitive to fluctuations in the supplied working voltages. Accordingly, it is often necessary to interpose between the source of electrical energy and the connected electronic device a regulating arrangement for insuring that the potential supplied to the device remains at some predetermined constant amplitude.

As with any other electrical device, it is desirable that a voltage regulator be electrically efficient. Many of the regulating arrangements previously disclosed, however, have contemplated at least the partial dissipation of any excess energy from the power source within the regulator itself and have accordingly been quite inefficient. A preferred type of regulating device, sometimes termed the "switching regulator," does not possess this disadvantage. According to this scheme, a switch is employed for repetitiously connecting and disconnecting the source and an energy storage element such as a reactance. Each time the switch is "On," the source delivers a short burst of energy to the storage element. This storage element gives up its energy to the load (usually through a filtering network which suppresses "ripple") such that the load receives a constant flow of energy. The magnitude of energy delivered to the load is thus dependent upon the average energy flowing from the source into the storage element. Regulation is achieved by varying the ratio of the switch's "ON time" to its "OFF time" in response to load voltage fluctuations. Since neither the reactive storage element, the switch, nor the filtering network need dissipate any substantial amounts of Joulean heat, the switching type regulator is highly efficient.

A variety of different switching elements have been employed in previously disclosed regulators. U.S. Patent 2,965,832 which issued Dec. 20, 1960, to T. Lode, discloses the use of a vacuum tube in a switching type converter. The switching regulator described in U.S. Patent 3,215,925, which issued Nov. 2, 1965 to J. W. Rieke employs PNPN "controlled rectifiers" as switching elements. Transistors operating in the switching mode have also been previously employed in these regulators. Applicant's U.S. Patent 3,229,194, which issued Jan. 11, 1966, for example, shows the use of a transistor switch being self-excited in the manner of a relaxation oscillator.

When power transistors are used as switches, they are normally driven from an OFF condition into a saturated ON condition. When saturated, the power transistor is capable of carrying large amounts of current with small heat dissipation. When switched, however, the transistor must pass between the ON condition and the OFF condition. A substantial voltage drop exists across the transistor during this transition period and, even though the period is of a short duration, it does provide a significant contribution to the total amount of heat which must be dissipated by the transistor. It is desirable, therefore, in order to increase the transistor's power handling capabilities, that it be switch as rapidly as possible. The various switching regulator configurations suggested by the prior art, however, suffer the disadvantage of relatively slow switching times.

Because of the transistor's limited power-handling capability, the PNPN controlled rectifier is normally preferred in switching regulator applications. Unfortunately the PNPN device is unlike the transistor in that its transconductive path must be reverse-biased to turn it OFF even after the forward-biasing control current has been totally removed. In the usual switching regulator circuit, the transconductive path of the PNPN device would always be forward-biased; consequently, it becomes necessary to provide a relatively high power level method of obtaining the necessary "turn-off" bias.

It is a general object of the present invention to open and close an electrical circuit in response to electrical control signals and, more particularly, to provide pulse responsive switching apparatus which may be advantageously employed in switching-type power conversion systems.

It is a further object of the present invention to regulate the magnitude of direct-current energy delivered to a load.

It is a related object of the present invention to regulate the average amount of time a circuit is closed in response to a control voltage.

In a principal aspect, the present invention takes the form of a new and improved DC to DC power converter of the switching regulator variety. In the converter, a power transistor operating in the switching mode is employed for repeatedly connecting and disconnecting the source to an energy storage element. In accordance with a principal feature of the invention, this transistor is switched rapidly ON and OFF under the control of a pulse-operated semiconductor PNPN device. In accordance with still another feature of the invention, a new and improved pulse position modulation technique is employed to vary the ratio of the transistor switch's "ON time" to "OFF time" in response to load voltage fluctuations.

These and other objects, features and advantages of the present invention will become more apparent upon a consideration of the following detailed description of specific embodiments of the invention. This description will be best understood when taken in conjunction with the attached drawings in which FIGS. 1, 2 and 3 illustrate circuits known to the prior art while FIGS. 4, 5 and 6 relate the present invention. More particularly:

Figure 3:
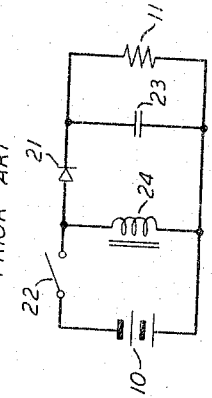
FIG. 3 depicts a polarity inverting switching regulator which delivers an output voltage having the opposite polarity to the input voltage.
Figure 2:
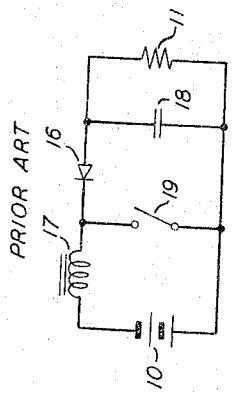
FIG. 2 illustrates a DC to DC "step-up" switching regulator wherein the load voltage is greater than the source voltage.
Figure 1:
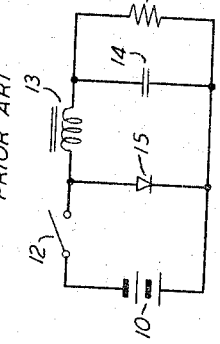
FIG. 1 shows a DC to DC "step-down" switching regulator wherein the output voltage supplied to the load is less than the source voltage.

FIGS. 1, 2, and 3 show different varieties of switching type electrical conversion apparatus which have been disclosed by the prior art. Each of these conversion systems supplies a unidirectional voltage from a source 10 to a load 11.

In the prior art circuit shown in FIG. 1, a switch 12, an inductor 13 and load 11 are connected in series across the terminals of the source 10. A capacitor 14 is connected in parallel with load 11 and a diode 15 is connected in parallel with the series combination of source 10 and switch 12. In operation, switch 12 opens and closes rapidly in alternation. Whenever switch 12 is closed, diode 15 is back-biased and current flows from the positive terminal of source 10 through load 11 inductor 13 and switch 12. Whenever switch 12 is opened, the load current, since it may not cease flowing through inductor 13 instantaneously, continues to flow through load 11, inductor 13 and diode 15. From another viewpoint, it may be considered that disconnecting the source 10 by opening switch 12 causes the load current to decrease, thereby inducing a "back voltage" in inductor 13. This back voltage forward-biases diode 15 and causes current to flow through the load in the same direction that it flowed while switch 12 was closed. The capacitor 14, it may be noted, is not strictly necessary, but merely serves to suppress the ripple component caused by the switching.

The magnitude of the load voltage is dependent upon the amount of time switch 12 is closed. If it is assumed that the switching rate is sufficiently rapid such that the load voltage is essentially constant, then it may be shown that;

$$\frac{\text{ON time}}{\text{OFF time}} = \frac{\text{Load Voltage}}{\text{Source Voltage} - \text{Load Voltage}}$$

Hence, it will be apparent that by increasing the ratio of ON time to OFF time, the load voltage may be increased.

In the prior art switching converter pictured in FIG. 2, the load 11, a diode 16 and an inductor 17 are serially connected across the terminals of source 10. A capacitor 18 is connected across load 11 and switch 19 is connected in parallel with the series combination of inductor 17 and source 10. The operation of the circuit shown in FIG. 2 is somewhat similar to that of FIG. 1. Whenever switch 19 is closed, current flows through switch 19 and inductor 17. When switch 19 is opened, the inductor 17 tries to keep the source current as large as it was before, even though the load impedance has been added to the current loop. The back voltage across inductor 17, therefore, adds to the source voltage such that the load voltage is even higher than the source voltage. Capacitor 18 charges up to this higher voltage. When switch 19 is closed, diode 16 is back-biased, the capacitor 18 holds the voltage across load 11 at an essentially constant value and the current in inductor 17 once again increases.

If, in the circuit of FIG. 2, the switching rate is sufficiently rapid that the current through inductor 17 is essentially constant, it may be shown that;

$$\frac{\text{ON time}}{\text{OFF time}} + 1 = \frac{\text{Load Voltage}}{\text{Source Voltage}}$$

Hence, it may be seen that if the ratio of ON time to OFF time for the switch 19 is increased, the load voltage increases.

The prior art circuit illustrated in FIG. 3 delivers a voltage to the load which is of opposite polarity to the source voltage. In FIG. 3, load 11, diode 21 and switch 22 are serially connected across the source 10. A capacitor 23 is connected in parallel with load 11 and an inductor 24 is connected in parallel with the series combination of source 10 and switch 22. When switch 22 is closed, the diode 21 is back-biased and current flows from the source 10 through inductor 24 and switch 22. When switch 22 is open, current must continue to flow in the same direction through inductor 24 thereby causing an induced back voltage in the inductor 24 which forward biases diode 21 and delivers a positive voltage to the load 11. If the switching rate is sufficiently rapid so that the current through inductor 24 is substantially constant, then:

$$\frac{\text{ON time}}{\text{OFF time}} = \frac{\text{Load Voltage}}{\text{Source Voltage}}$$

Therefore, once again, it may be seen that an increase in the ratio of ON time to OFF time increases the magnitude of the output voltage.

It has been previously disclosed that this relationship between the switching and the load voltage might be used to provide load voltage regulation. In these systems, which are normally termed "switching regulators," various means have been employed to control the ON time in response to load voltage. In U.S. Patent No. 3,229,194 supra, a switching regulator circuit employing a transistor relaxation oscillator, was described. In that arrangement, a winding on the oscillator transformer was employed to control the rate of flux dissipation in the transformer core and hence the OFF time of the oscillator in response to load voltage fluctuations. While this prior regulator does possess significant advantages over other forms of regulators, its capacity is limited by the characteristics of the switching transistor and the control range of ON to OFF time is likewise limited. The present invention employs a transistor switching arrangement of increased capacity which circumvents many difficulties found in prior art switching regulators.

Figure 4:
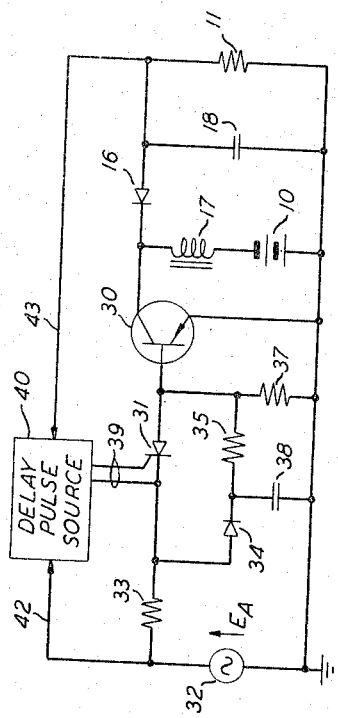
FIG. 4 is schematically illustrated a switching regulator which incorporates features of the present invention.

FIG. 4 of the drawings illustrates a switching regulator which employs the principles of the present invention. The regulator shown in FIG. 4 is basically a "step-up" regulator like that of FIG. 2 with the exception of the switching circuitry which performs the function of the switch 19 shown in FIG. 2. Although the two drawings are arranged somewhat differently, it may be noted that in both a source of electrical energy 10 delivers energy to a load 11 by means of the regulating circuitry comprising diode 16, inductor 17 and capacitor 18.

In accordance with the present invention, a transistor 30 is gated ON and OFF by means of the cooperative action of a pulse-operated PNPN device 31 and a source of a periodic forward-biasing potential 32. The source 32 and the transconductive path of the PNPN device 31 are connected in series with a resistance 33 between the collector and emitter of the transistor 30.

Source 32 generates a rectangular-wave voltage $E_A$ as shown in FIG. 5A. Whenever the voltage $E_A$ is positive, both the emitter-base junction of transistor 30 and the transconductive path of PNPN device 31 are back-biased. As source voltage $E_A$ turns negative, the still non-conducting PNPN device 31 prevents the flow of forward-biasing base current to transistor 30 until a pulse appears from delay pulse source 40. When this switching pulse appears, the transistor 30 is turned ON as illustrated by FIGS. 5B and 5C. The rectangular wave may have different periods for the positive and negative half-cycles. If the positive half-cycle period is made small relative to the negative half-cycle period, the duty cycle of transistor 30 may be made to approach 100 percent ON by use of a minimum of delay, or the duty cycle may be made zero ON by extending the delay or cutting of the pulse source 40. Thus this circuit possesses a wide range of control.

It is the function of the delay pulse source 40 to generate a series of pulses each of which appear at some controllable delay time following the appearance of a forward-biasing voltage from the square-wave source 32. The size of this delay time, designated as "α" in FIG. 5, varies in response to fluctuations in load voltage to provide voltage regulation. The delay pulse source 40 is provided with an output 39 which is connected to supply switching pulses across the gate and cathode electrodes of the PNPN controlled rectifier device 31. The delay pulse source 40 is also provided with two inputs; a synchronizing input 42 which is connected to the periodic source 32 and a load voltage input 43 which is connected to load 11.

The structure comprising diode 34, resistances 35 and 37, and capacitor 38 is included to insure that transistor 30 is solidly turned OFF and not subject to either avalanche breakdown or thermal runaway. When source voltage $E_A$ is positive, capacitor 38 is charged through diode 34. When the voltage $E_A$ is negative, the charge remains trapped on capacitor 38 thus allowing a positive turn-off voltage to be applied to the base of transistor 30. This positive voltage holds transistor 30 in an OFF condition until PNPN device 31 is "fired."

It is important to note that when PNPN device 31 is fired a large amount of forward-biasing base current appears immediately at the base of transistor 30 driving that transistor rapidly into a saturated conductive condition. The very short time duration required to turn ON transistor 30 minimizes the heat dissipated during its transition from an OFF condition to a saturated ON condition. Thereafter, because the transistor is saturated and the voltage drop across it is very small, it may conduct large amounts of current without dissipating damaging amounts of Joulean heat.

When the voltage $E_A$ from the source of oscillations 31 goes positive once again, both the emitter-base junction of transistor 30 and the PNPN device 31 become back-biased and the transistor is turned OFF. The condition of the transistor switch 30 is shown in FIG. 5C. It may be noted that the ratio of ON time to OFF time for transistor switch 30 is determined by the time position of the pulses from pulse source 40. It is the function of pulse source 40 to regulate the output voltage by varying the duration of the delay time α in response to load voltage fluctuations. If the output voltage should drop, for instance, pulse source 40 advances the pulses which turn ON the control rectifier 33 and hence increases the ratio of ON time to OFF time for transistor switch 30, thereby causing the output voltage to rise once more to its former value.

Figure 6:
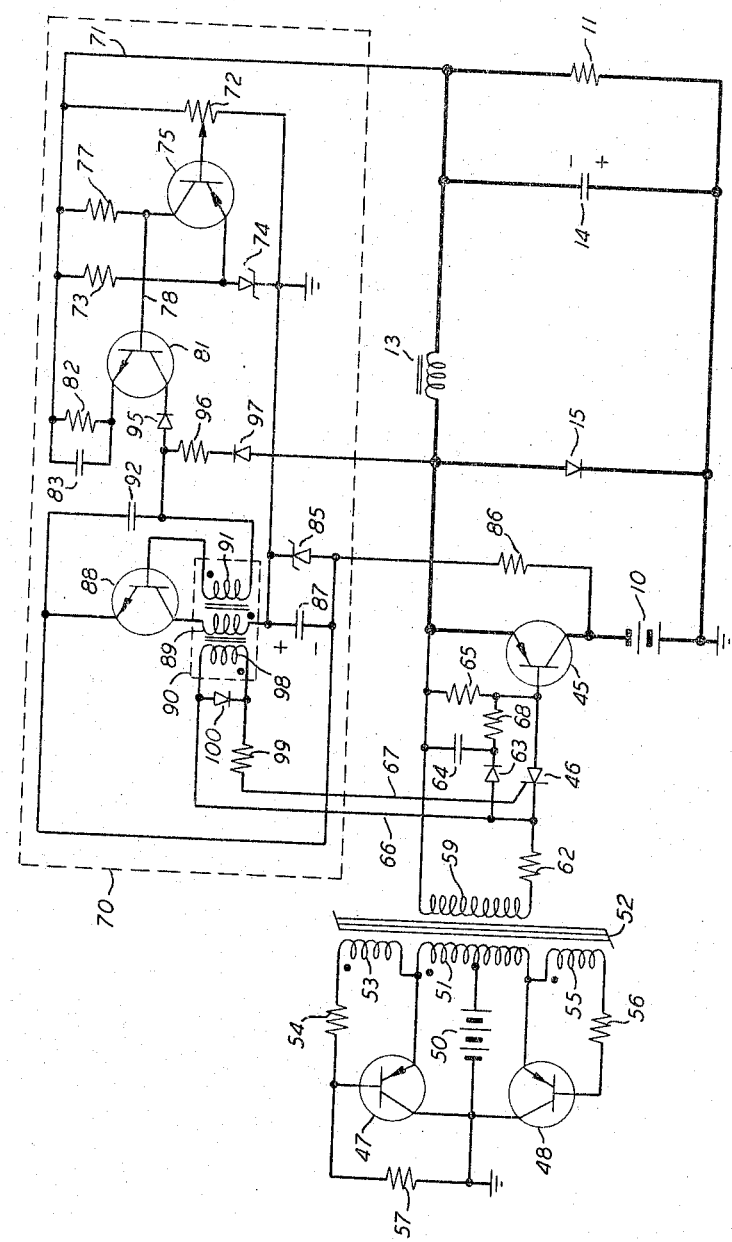
FIG. 6 is a schematic diagram of a more detailed embodiment of the invention.

FIG. 6 of the drawings schematically illustrates a more detailed embodiment of the present invention. The switching regulator pictured in FIG. 6 includes the "step-down" voltage conversion arrangement shown in FIG. 1 of the drawings and, since this portion of the regulator handles the power delivered from the source 10 to the load 11, it is shown in heavy lines. Like numerals have been used to designate components common to both FIGS. 1 and 6. A transistor 45 and PNPN device 46 are used in combination to provide the switching function for the voltage conversion apparatus.

A transistor oscillator of well-known design is employed to provide a source of electrical oscillations. This oscillator comprises two PNP transistors 47 and 48 each having their collectors connected in common to the negative terminal of a battery 50. The emitter electrodes of transistors 47 and 48 are connected together by means of a winding 51 wound on a saturable core 52. The winding 51 is provided with a tap which is connected to the positive terminal of the battery 50. The emitter and base of transistor 47 are connected by the series combination of a winding 53 and a resistance 54, while the emitter and base of the transistor 48 are connected by winding 55 and resistance 56. A starting resistance 57 connects the emitter and base of transistor 47. The oscillator is provided with an output winding 59 which, like the windings 51, 53 and 55, is wound on the saturable core 52.

The operation of the oscillator is straightforward. The starting resistance 57 initially forward-biases transistor 47 and current begins to flow through the upper half of winding 51. By transformer feedback between windings 51 and 53, the transistor 47 is turned ON even more until finally core 52 saturates. At that time the flux in core 52 no longer changes and no forward-biasing voltage is induced in the winding 53. Transistor 47 is accordingly turned OFF, and the current in the upper half of winding 51 decreases suddenly. A forward-biasing voltage is then induced in the winding 55 turning transistor 48 ON. These cycles continue, delivering a substantially rectangular wave output voltage to the terminals of winding 59. The positive and negative half-cycle periods may be made unequal by locating tap 51 off-center.

The controlled rectifier 46, resistance 62, and the winding 59 are connected in series between the base and emitter electrodes of transistor 45. The series combination of a diode 63 and a capacitor 64 is connected in series between the cathode of the controlled rectifier 46 and the emitter of transistor 45. Serially connected resistances 65 and 68 are connected in parallel with the capacitor 64 and the junction of resistances 65 and 68 is directly connected to the base of transistor 45. The voltage across capacitor 64 provides a "turn-off" bias for transistor 45 in order to suppress avalanche breakdown or thermal runaway during "OFF" periods.

The PNPN device 46 turns the transistor 45 ON in response to pulses appearing across the conductors 66 and 67. These pulses are developed in the control circuit 70 in a manner to be described.

The objective of control circuit 70 is the translation of load voltage fluctuations into variations in the time displacement of the control pulses delivered to the PNPN device 46. As load voltages increase, the delay time should increase. A negative voltage equal to the load voltage appears on conductor 71. A resistance 72, which is provided with a movable tap is connected between conductor 71 and ground. A second circuit path comprising resistance 73 and a Zener diode 74 is connected between conductor 71 and ground. The emitter of a PNP transistor 75 is connected to the junction of Zener diode 74 and resistance 73. The base of transistor 75 is connected to the movable tap on resistance 72. The collector of transistor 75 is connected to conductor 71 by means of a resistance 77. This portion of the control circuit 70 operates as an error-detector and is provided with an output conductor 78 which is attached to the junction of resistance 77 and the collector of transistor 75. The Zener diode 74 provides a constant negative voltage at the emitter electrode of the transistor 75 and the voltage at the base of transistor 75 is proportional to the load voltage. The emitter-collector current of transistor 75 is thus related to the difference between load voltage and the reference provided by Zener diode 74.

The conductor 78 is attached directly to the base electrode of an NPN transistor 81. The emitter electrode of transistor 81 is connected to conductor 71 by the parallel combination of a resistance 82 and a capacitor 83. The combination of transistor 81 and its associated circuitry provide a stage of amplification (and phase inversion) for the error-detector previously described.

A negative voltage is obtained from source 10 and applied through current limiting resistance 86 to the anode of a Zener diode 85. The cathode of the Zener diode 85 is grounded. Connected in parallel with Zener diode 85 is a capacitor 87 which is charged to the Zener diode's avalanche potential in the manner shown in FIG. 6. Capacitor 87 also forms a part of a circuit loop comprising the collector-emitter path of an NPN transistor 88 and a primary winding 89 of a feedback transformer 90. A secondary winding 91 of the feedback transformer 90 is connected in series with a capacitor 92 between the base and emitter electrodes of transistor 88. The junction of the capacitor 92 and the winding 91 is connected to the collector electrode of transistor 81 by a diode 95 which is polarized to allow current flow through the collector-emitter path of transistor 81. The series combination of a resistance 96 and a diode 97 connects the anode of diode 95 to the emitter of the switching transistor 45. One end of secondary winding 98 in feedback transformer 90 is connected to conductor 66, while the other is connected to conductor 67 by resistance 99. A diode 100 is connected in parallel with winding 98 to limit gate to cathode reverse voltage on the PNPN device.

The operation of the switching regulator shown in FIG. 6 is basically similar to the operation of the circuit pictured in FIG. 4. The ON time for the switching transistor 45 is regulated in response to load voltage fluctuations by the control circuit 70. Control circuit 70 positions pulses applied to controlled rectifier 46 in the manner illustrated by FIG. 5. The conductor 71 is at load voltage potential. The conductivity state of transistor 75 is therefore regulated in response to load voltage fluctuations—that is, increasing load voltage tends to lower the transconductive impedance of transistor 75 and to drive the base of transistor 81 more positive. This action forward biases the transistor 81 and allows increasing amounts of current to flow through the diode 95. Whenever transistor 45 is ON the anode of diode 97 is substantially connected to the negative terminal of battery 10 by means of transistor 45. Accordingly, diode 97 is blocked.

It will be remembered that the voltage at the emitter of transistor 88 is less negative than source 10 by some fixed voltage whose magnitude is determined by the breakdown potential of Zener diode 85. As soon as transistor 45 is turned OFF by the oscillator section, diode 15 becomes forward-biased from the energy stored in inductor 13 and the voltage at its anode is at substantially ground potential. A positive current then flows from the anode of diode 15, through the now forward biased diode 97 and resistance 96, to begin charging the timing capacitor 92. A portion of this charging current is bled away through diode 95, however, such that the charging rate of capacitor 92 is dependent upon the conductivity of transistor 81. As the transconductive impedance of transistor 81 increases, so does the charging rate.

As soon as sufficient time has elapsed, the base of transistor 88 will become forward-biased due to the polarity of charge on capacitor 92. The storage capacitor 87 will then begin to discharge through winding 89 of transformer 90 and the collector-emitter path of transistor 88. As this discharge begins, the transistor 88 will be turned ON even more by the voltage induced across winding 91. The capacitor 92 hence rapidly charges by flow of current from winding 91 through the base-to-emitter junction of transistor 88, until the transistor blocks when capacitor 92 is fully charged. While transistor 88 is conducting it passes a pulse of current through winding 89. This current pulse induces a pulse voltage in winding 98 and hence applies a pulse to the controlled rectifier 46, which permits the oscillator section to again turn transistor 45 ON. At the time transistor 88 stops conducting it leaves a negative turn-off voltage trapped on capacitor 92 until the cycle begins again when the oscillator turns OFF transistor 45.

Figure 5:
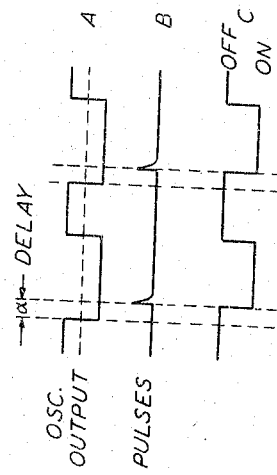
FIG. 5 shows waveforms which illustrate the operation of the circuit of FIG. 4.

It should be noted that the length of time required to charge capacitor 92 to a voltage sufficient to forward bias transistor 88 is dependent upon the conductivity state of transistor 81. An increase in load voltage lowers the transconductive impedance of transistor 75 and the base of transistor 81 becomes more positive. With this increase in forward-bias, transistor 81 becomes more conductive thus shunting away an increasing amount of charging current from the timing capacitor 92. An increase in load voltage accordingly tends to delay the firing pulses delivered by the blocking oscillator. In other words, the delay time α pictured in FIG. 5 is lengthened in response to an increase in load voltage and the transistor 45 is ON for shorter periods. The ratio of "ON time" to "OFF time" is thus decreased and the load voltage is regulated.

It will be apparent to those skilled in the art that numerous modifications may be made to the embodiments of the present invention hereinbefore described without departing from the true spirit and scope of the invention.

What is claimed is:

1. Switching apparatus for opening and closing a circuit path which comprises, in combination, a transistor having collector, emitter and base electrodes, the collector-emitter path of said transistor being serially connected with said circuit path, a PNPN device having a transconductive path and a control electrode, a source of rectangular wave signal, circuit means for connecting said source and said transconductive path in series between the emitter and base electrodes of said transistor, means actuated by said rectangular wave signal for developing firing pulses of varying time position with respect to said rectangular wave signal, and means for applying said pulses to the control electrode of said PNPN device, whereby the average duration of time said circuit path is closed may be varied.

2. Apparatus as set forth in claim 1 wherein said circuit path includes a source of electrical energy and a load and wherein said pulse developing means operates under the control of the potential existing across said load.

3. Power supply apparatus comprising, in combination, a first circuit loop including a source of unidirectional energy connected in series with switching means for alternately opening and closing said first circuit loop, and a second circuit loop comprising the series combination of a unidirectional conducting device and a load impedance, said first and said second circuit loops having a common portion which includes an inductor, said apparatus being characterized in that said switching means comprises a transistor having a base electrode and a collector-emitter path, said collector-emitter path being connected in series with said first circuit loop, a source of switching signals, a source of periodic forward-biasing potential for said transistor, and a PNPN device for gating said forward biasing potential to said base electrode of said transistor in response to said switching signal.

4. A voltage regulated power supply comprising, in combination, a transistor switch having collector, emitter and base electrodes, a first series circuit loop including a source of unidirectional potential, an inductor and the collector-emitter path of said transistor switch, a second series circuit loop including a unidirectional conducting device and a load, said first and second loops having a common portion that includes at least said inductor, a source of rectangular wave signal, a semi-conductor controlled rectifier having a transconductive path and a control electrode, circuit means for connecting said source of rectangular wave signal and said transconductive path in series between the emitter and base electrodes of said transistor switch, means actuated by said rectangular wave signal for generating switching pulses of a phase relationship to said rectangular wave signal that is varied in response to the potential existing across said load, and circuit means for applying said pulses to said control electrode, whereby the average duration of time said first circuit loop is closed may be varied to regulate said load potential.

5. A power supply as in claim 4 including a filter capacitor connected across said load to reduce the fluctuations in load voltage.

6. A power supply as in claim 5 wherein said means for generating switching pulses comprises a blocking oscillator having a timing capacitor for initiating a pulse whenever the voltage across said timing capacitor reaches a predetermined level, a second transistor connected to shunt the charging current of said timing capacitor and a biasing circuit connected across said load for controlling the impedance of said second transistor.

References Cited

UNITED STATES PATENTS

| | | | |
|---|---|---|---|
| 2,820,941 | 1/1958 | Berkery | 321—18 |
| 3,179,818 | 4/1965 | Urban | 323—22 X |
| 3,192,441 | 6/1965 | Wright | 307—88.5 X |
| 3,218,542 | 11/1965 | Taylor | 323—22 |
| 3,219,906 | 11/1965 | Keller et al. | 321—16 |
| 3,239,748 | 3/1966 | Berglund | 323—22 |

JOHN F. COUCH, *Primary Examiner.*

W. E. RAY, M. L. WACHTELL, *Assistant Examiners.*